(12) United States Patent
Yushin et al.

(10) Patent No.: US 10,411,290 B2
(45) Date of Patent: Sep. 10, 2019

(54) STABILIZATION OF LI-ION BATTERY ANODES

(71) Applicant: Sila Nanotechnologies Inc., Alameda, CA (US)

(72) Inventors: Gleb Nikolayevich Yushin, Atlanta, GA (US); Bogdan Zdyrko, Clemson, SC (US); Kara Evanoff, Reno, NV (US)

(73) Assignees: Sila Nanotechnologies, Inc., Alameda, CA (US); Georgia Tech Research Corporation, Atlanta, GA (US)

( * ) Notice: Subject to any disclaimer, the term of this patent is extended or adjusted under 35 U.S.C. 154(b) by 0 days.

(21) Appl. No.: 15/728,458

(22) Filed: Oct. 9, 2017

(65) Prior Publication Data

US 2018/0034099 A1     Feb. 1, 2018

Related U.S. Application Data

(62) Division of application No. 13/366,594, filed on Feb. 6, 2012, now Pat. No. 9,786,947.

(Continued)

(51) Int. Cl.
*H01M 10/0525* (2010.01)
*H01M 4/38* (2006.01)
(Continued)

(52) U.S. Cl.
CPC ......... *H01M 10/0525* (2013.01); *H01M 4/38* (2013.01); *H01M 4/386* (2013.01);
(Continued)

(58) Field of Classification Search
CPC ......... H01M 10/0525; H01M 10/0568; H01M 10/42; H01M 4/38; H01M 4/46;
(Continued)

(56) References Cited

U.S. PATENT DOCUMENTS

| 2005/0042514 A1* | 2/2005 | Sun ..................... H01M 4/131 429/231.95 |
| 2006/0008706 A1 | 1/2006 | Yamaguchi et al. |

(Continued)

FOREIGN PATENT DOCUMENTS

| EP | 1205989 A2 | 5/2002 |
| JP | 11-007942 A | 1/1999 |

(Continued)

OTHER PUBLICATIONS

Lee et al. "Synthesis of Tin-Encapsulated Spherical Hollow Carbon for Anode Material in Lithium Secondary Batteries", J .Amer. Chem. Soc. 2003, 125, 5652-5653 (Year: 2003).*
"Synthesis of Tin-Encapsulated Spherical Hollow Carbon for Anode Material in Lithium Secondary Batteries", Kyu T. Lee et al., Journal of the American Chemical Society, vol. 125, Issue No. 19, pp. 5652-5653, Apr. 22, 2003.

*Primary Examiner* — Alexander Usyatinsky
(74) *Attorney, Agent, or Firm* — Steven Driskill

(57) ABSTRACT

Li-ion batteries are provided that include a cathode, an anode comprising active particles, an electrolyte ionically coupling the anode and the cathode, a separator electrically separating the anode and the cathode, and at least one hydrofluoric acid neutralizing agent incorporated into the anode or the separator. Li-ion batteries are also provided that include a cathode, an anode comprising active particles, an electrolyte ionically coupling the anode and the cathode, and a separator electrically separating the anode and the cathode, where the electrolyte may be formed from a mixture of an imide salt and at least one salt selected from the group consisting of $LiPF_6$, $LiBF_4$, and $LiClO_4$. Li-ion battery anodes are also provided that include an active material core and a protective coating at least partially encasing the active material core, where the protective coating comprises a material that is resistant to hydrofluoric acid permeation.

8 Claims, 13 Drawing Sheets

Related U.S. Application Data

(60) Provisional application No. 61/440,104, filed on Feb. 7, 2011.

(51) Int. Cl.
*H01M 4/46* (2006.01)
*H01M 4/62* (2006.01)
*H01M 10/0568* (2010.01)
*H01M 10/42* (2006.01)

(52) U.S. Cl.
CPC ........... *H01M 4/387* (2013.01); *H01M 4/463* (2013.01); *H01M 4/466* (2013.01); *H01M 4/628* (2013.01); *H01M 10/0568* (2013.01); *H01M 10/4235* (2013.01); *Y02E 60/122* (2013.01); *Y02T 10/7011* (2013.01)

(58) Field of Classification Search
CPC ........ H01M 4/62; H01M 4/386; H01M 4/387; H01M 4/463; H01M 4/466; H01M 10/4235; H01M 4/628; Y02T 10/7011; Y02E 60/122
See application file for complete search history.

(56) References Cited

U.S. PATENT DOCUMENTS

| | | |
|---|---|---|
| 2007/0148540 A1 | 6/2007 | Chiga et al. |
| 2008/0145752 A1 | 6/2008 | Hirose et al. |
| 2008/0311472 A1* | 12/2008 | Yamaguchi ......... H01M 4/1397 429/218.1 |
| 2009/0053599 A1* | 2/2009 | Ichihashi .......... H01M 10/0525 429/199 |
| 2013/0040203 A1* | 2/2013 | Yoon .................. H01M 4/1393 429/231.8 |

FOREIGN PATENT DOCUMENTS

| | | |
|---|---|---|
| JP | 2002-216751 A | 8/2002 |
| JP | 2003-303588 A | 10/2003 |
| JP | 2006-216374 A | 8/2006 |
| JP | 2009-021229 A | 1/2009 |
| JP | 2010-003675 A | 1/2010 |
| WO | WO 2011084817 * | 7/2011 |

* cited by examiner

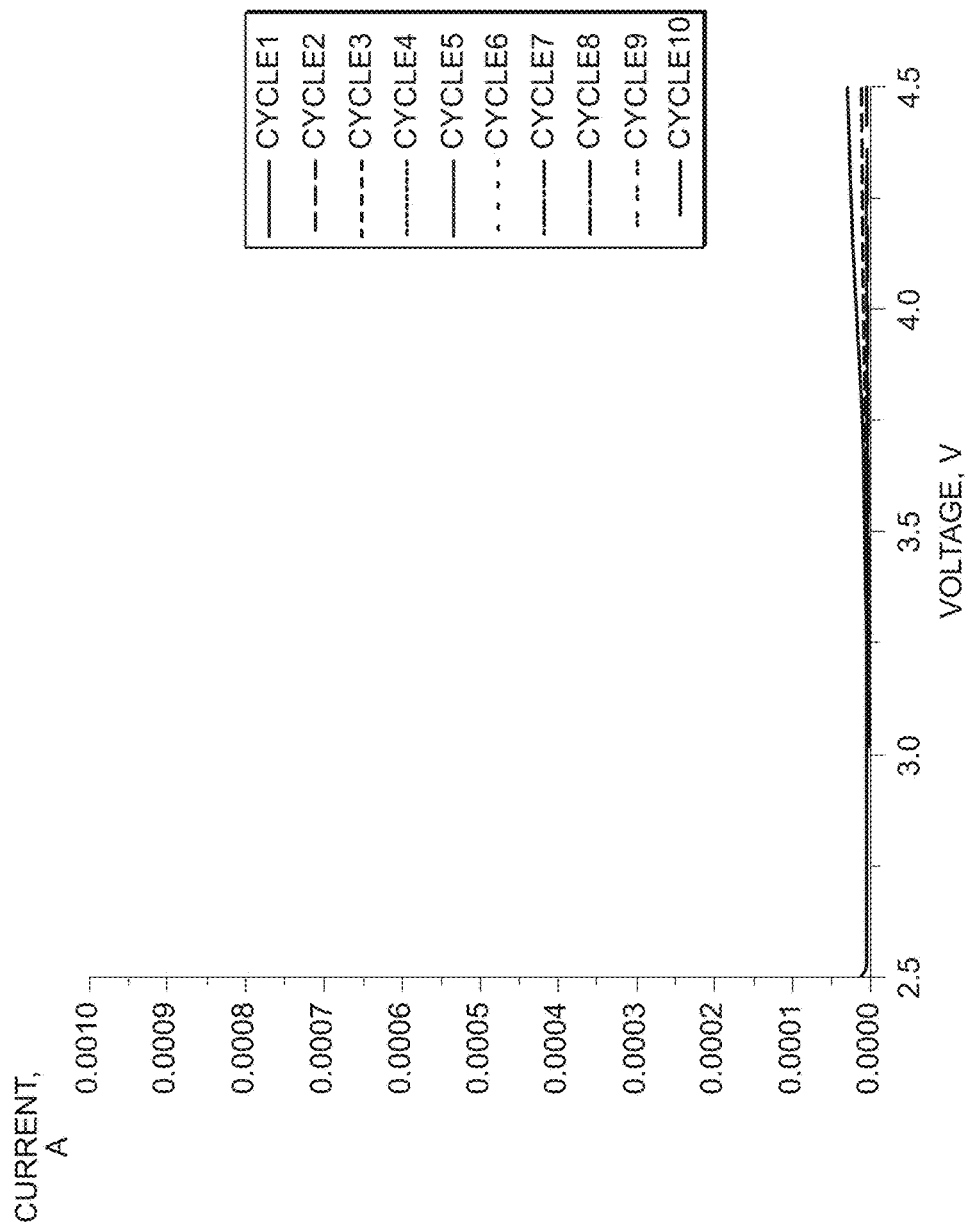

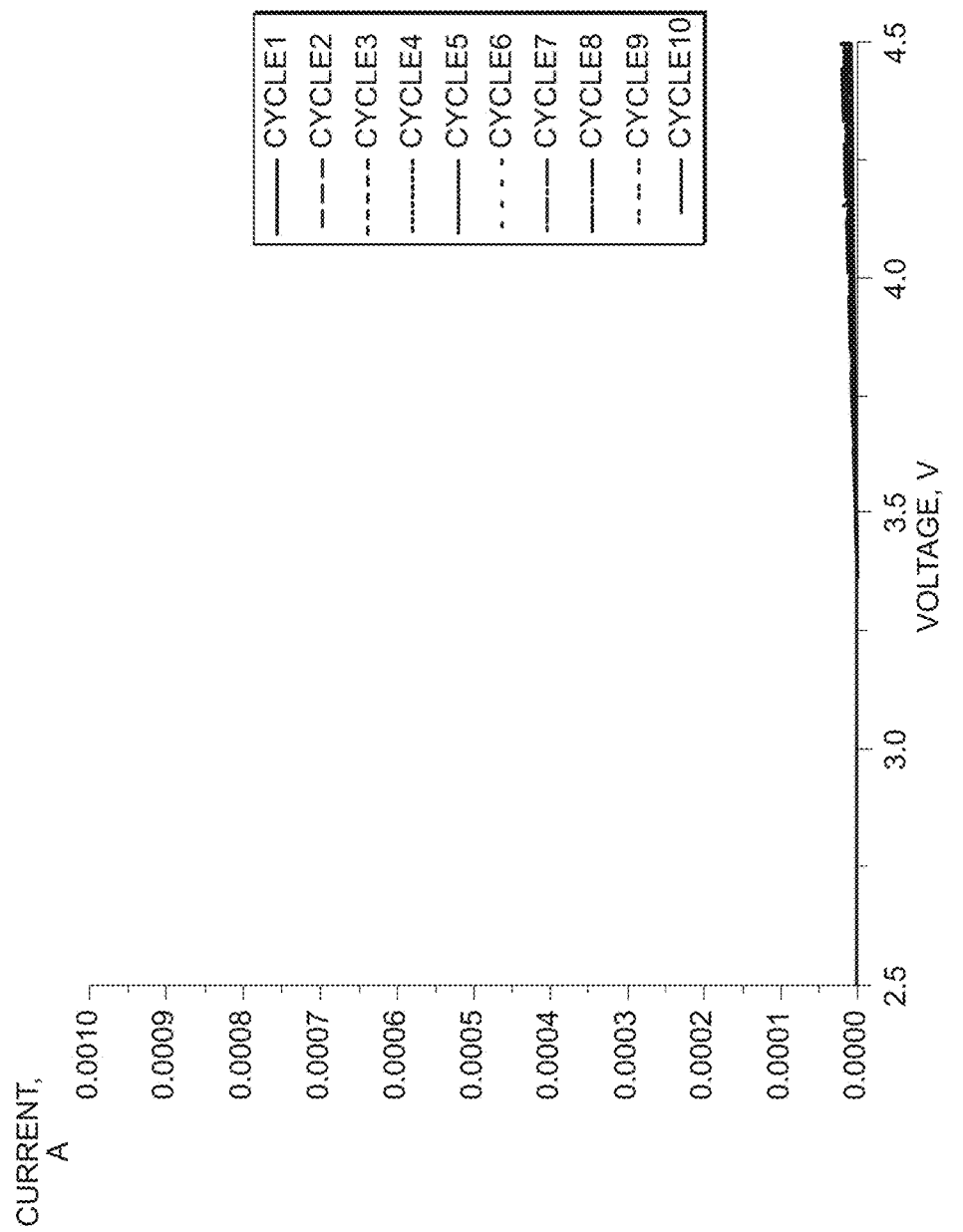

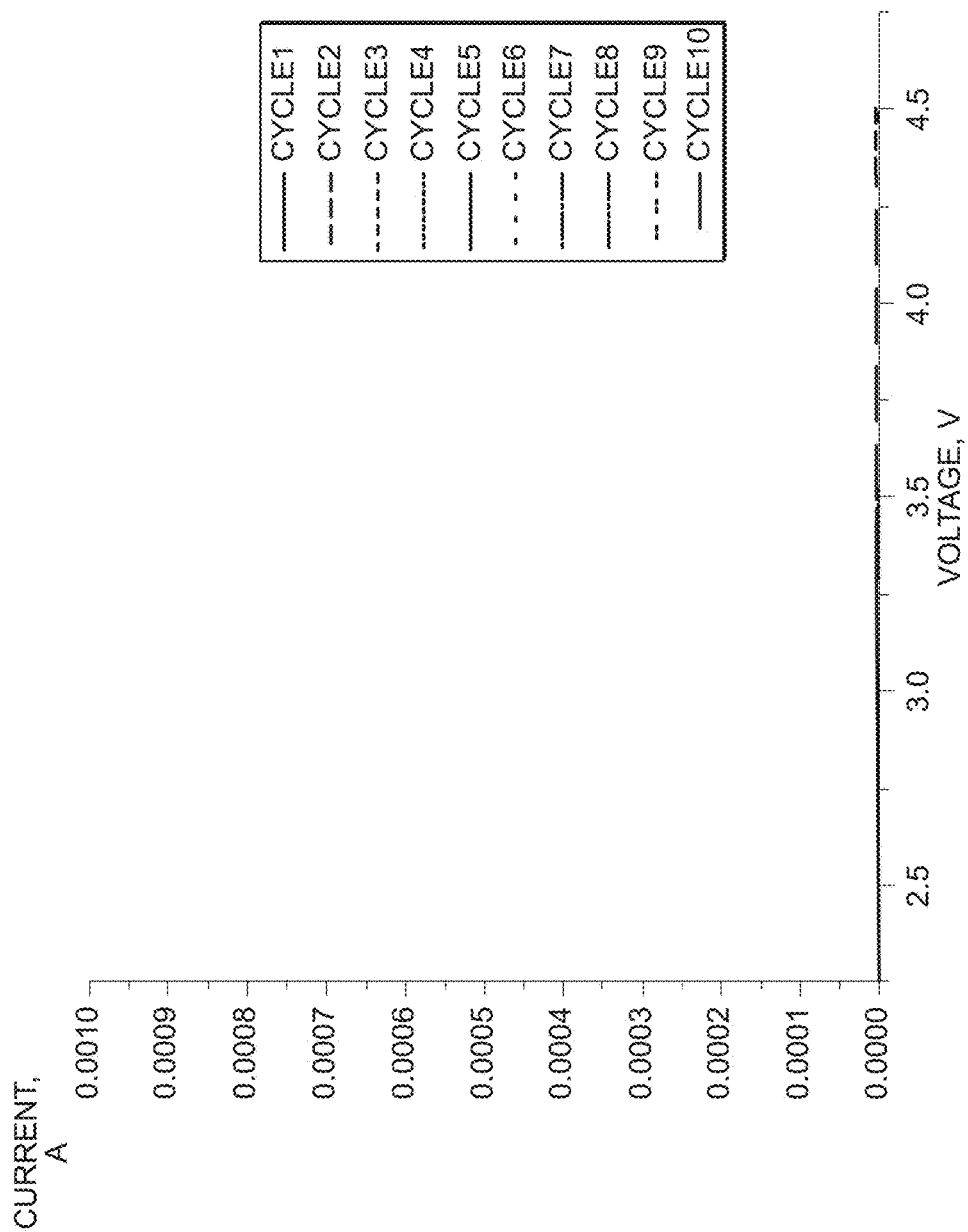

STABILIZATION OF LI-ION BATTERY ANODES

CLAIM OF PRIORITY UNDER 35 U.S.C. § 119

The present application for patent claims priority to Provisional Application No. 61/440,104 entitled "Stabilization of Silicon Anode-Containing Li Ion Batteries" filed on Feb. 7, 2011, which is expressly incorporated by reference herein.

CLAIM OF PRIORITY UNDER 35 U.S.C. § 120

The present Application for Patent is a divisional of patent application Ser. No. 13/366,594 entitled "STABILIZATION OF LI-ION BATTERY ANODES" filed Feb. 6, 2012, pending, and assigned to the assignee hereof and hereby expressly incorporated by reference herein.

BACKGROUND

Field

The present disclosure relates generally to energy storage devices, and more particularly to lithium-ion battery technology.

Background

Owing in part to their relatively high energy densities, light weight, and potential for long lifetimes, lithium-ion (Li-ion) batteries are used extensively in consumer electronics. In fact, Li-ion batteries have essentially replaced nickel-cadmium and nickel-metal-hydride batteries in many applications. Despite their increasing commercial prevalence, further development of Li-ion batteries is needed, particularly for potential applications in low- or zero-emission hybrid-electrical or fully-electrical vehicles, consumer electronics, energy-efficient cargo ships and locomotives, aerospace, and power grids. Such high-power applications will require electrodes with higher specific capacities than those used in currently-existing Li-ion batteries.

Currently, carbon-based materials (e.g., graphite) are employed as the predominant anode material in Li-ion batteries. Carbon (C), in the form of graphite, has a maximum or theoretical specific capacity of about 372 milli-Ampere hours per gram (mAh/g), but suffers from significant capacity losses during formation cycling. Notably, during the first charge cycle, graphite experiences a high level of irreversibility, meaning that a significant amount of lithium ions intercalate into the graphite anode, but do not deintercalate out of the anode upon discharge of the battery. This results in a limited capacity for carbon-based materials.

A variety of higher capacity materials have been investigated to overcome these drawbacks. Silicon-based materials, for example, have received great attention as anode candidates because they exhibit specific capacities that are an order of magnitude greater than that of conventional graphite. Silicon (Si) has the highest theoretical specific capacity of all the metals, topping out at about 4200 mAh/g. Unfortunately, silicon suffers from its own significant setbacks.

The primary shortcoming of Si-based anode materials is the volume expansion and contraction that occurs as a result of lithium ion alloying or dealloying, respectively, during charge cycling of the battery. In some cases, a silicon-based anode can exhibit an increase, and subsequent decrease, in volume of up to about 400%. These high levels of strain experienced by the anode material can cause irreversible mechanical damage to the anode. Ultimately, this can lead to a loss of contact between the anode and an underlying current collector.

Thus, despite the advancements made in anode materials, Li-ion batteries remain somewhat limited in their applications. Accordingly, there remains a need for improved anodes for use in Li-ion batteries. In particular, achieving stable anode performance has been a challenge for many higher capacity materials. These improved anodes, and, ultimately, the improved Li-ion batteries, could open up new applications, such as the so-called high-power applications contemplated above.

SUMMARY

Embodiments disclosed herein address the above stated needs by providing improved Li-ion battery components, improved Li-ion batteries made therefrom, and methods of making and using the same.

In some embodiments, a Li-ion battery is provided that comprises a cathode, an anode comprising active particles, an electrolyte ionically coupling the anode and the cathode, a separator electrically separating the anode and the cathode, and at least one hydrofluoric acid neutralizing agent incorporated into the anode or the separator. The active particles may comprise, for example, at least one of silicon (Si), germanium (Ge), tin (Sn), titanium (Ti), aluminum (Al), or magnesium (Mg). The hydrofluoric acid neutralizing agent may be, for example, a hydrofluoric acid binding metal derivative salt or oxide, or a Lewis base having a free pair of electrons. The hydrofluoric acid neutralizing agent may be, in different designs, (i) disposed in an active powder from which the anode is formed, (ii) part of a polymer coated onto the active particles, (iii) integrated into or formed onto the separator, or (iv) disposed in a binder mixed in with the active particles in the anode, or a combination thereof.

In other embodiments, a Li-ion battery is provided that comprises a cathode, an anode comprising active particles, an electrolyte ionically coupling the anode and the cathode, and a separator electrically separating the anode and the cathode, where the electrolyte may be formed from a mixture of an imide salt and at least one salt selected from the group consisting of lithium hexafluorophosphate ($LiPF_6$), lithium tetrafluoroborate ($LiBF_4$), and lithium perchlorate ($LiClO_4$). The imide salt may make up, for example, at least 50% of the electrolyte by weight. In some designs, the imide salt may make up a percentage in the range of about 75% to about 90% of the electrolyte by weight. The imide salt may be one or more of a particular class of lithium compounds, as discussed in more detail below.

In still other embodiments, a Li-ion battery anode is provided for insertion and extraction of lithium ions. The Li-ion anode may comprise an active material core and a protective coating at least partially encasing the active material core, where the protective coating comprises a material that is resistant to hydrofluoric acid permeation. The active material core may comprise, for example, at least one of silicon (Si), germanium (Ge), tin (Sn), titanium (Ti), aluminum (Al), or magnesium (Mg). The protective coating may be a Li-ion permeable and electrolyte solvent impermeable material comprising a polymer, a metal oxide, a metal fluoride, carbon, or a combination thereof. In some designs, the protective coating may be a flexible material capable of stretching during lithiation and contracting during delithiation. In other designs, the protective coating may form a mechanically stable and plastically deformable shell around the active material core. In this case, the Li-ion battery anode may further comprise a carbon-based layer disposed between the protective coating shell and the active material core. In addition, at least one pore may be disposed between the protective coating shell and the active material core when the active material core is in a delithiated state to accommodate volume changes in the active material core during lithiation. The at least one pore disposed between the protective coating shell and the active material core may comprise multiple pores separated by a carbon-based intervening material also disposed between the protective coating shell and the active material core. The Li-ion battery anode may also further comprise an additional polymer or carbon conductive layer disposed on the protective coating shell. The protective coating shell may provide a mechanically stable surface for forming a solid-electrolyte interphase layer. A Li-ion battery may also be provided that comprises such a Li-ion battery anode.

BRIEF DESCRIPTION OF THE DRAWINGS

The accompanying drawings are presented to aid in the description of embodiments of the invention and are provided solely for illustration of the embodiments and not limitation thereof.

FIGS. 1A-1E illustrate several example electrolyte compositions and their disparate effects on the corrosion of aluminum cathodes.

DETAILED DESCRIPTION

Figure 1B:
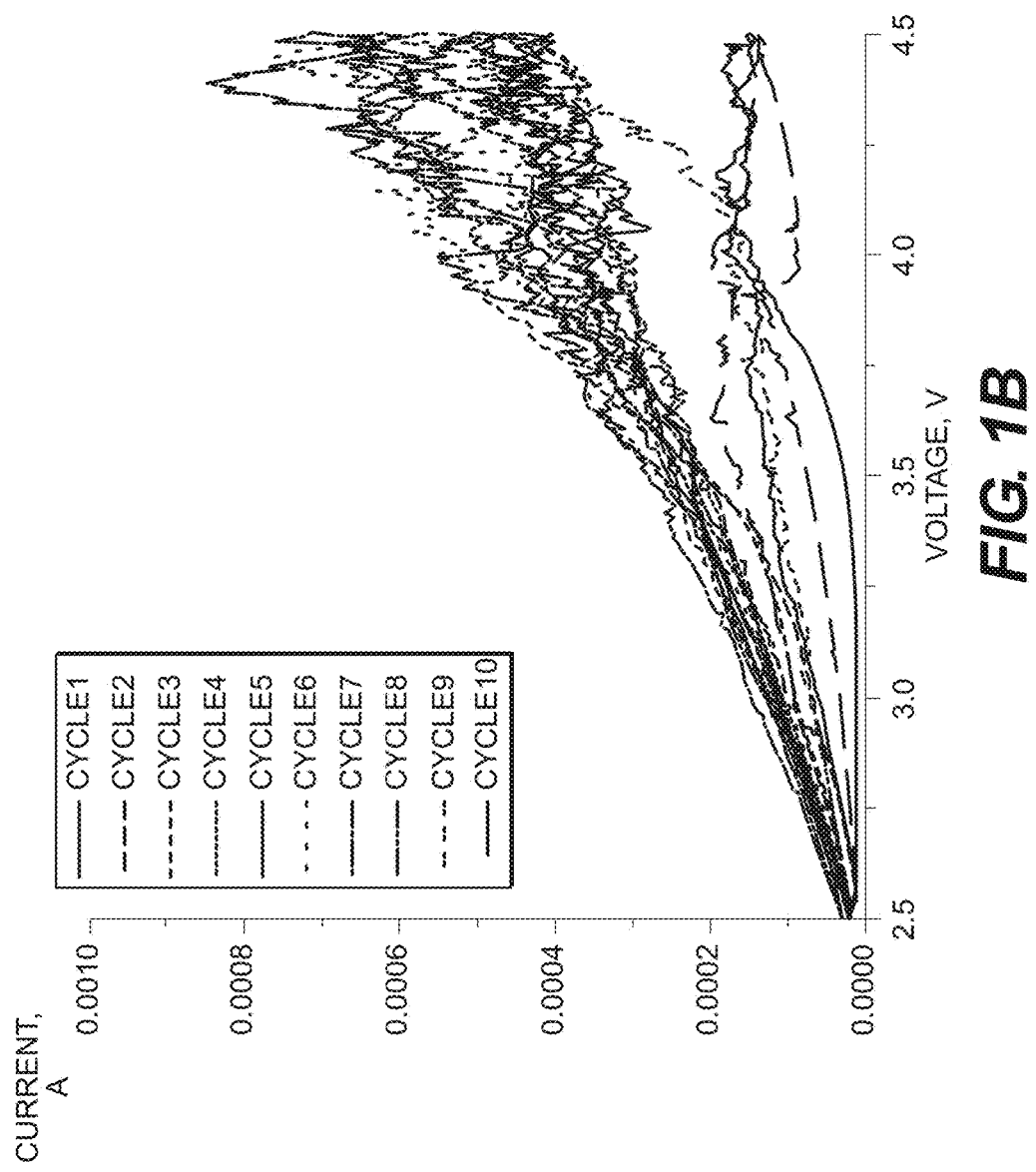

Aspects of the present invention are disclosed in the following description and related drawings directed to specific embodiments of the invention. The term "embodiments of the invention" does not require that all embodiments of the invention include the discussed feature, advantage, process, or mode of operation, and alternate embodiments may be devised without departing from the scope of the invention. Additionally, well-known elements of the invention may not be described in detail or may be omitted so as not to obscure other, more relevant details.

As discussed in the background above, achieving stable anode performance in Li-ion batteries has been a challenge for many higher capacity anode materials. This is true for a variety of reasons, not all of which are fully understood. The inventors have discovered, for example, that the presence of hydrofluoric acid (HF) in the battery electrolyte or generated in-situ during Li-ion cell cycling contributes to one of the key silicon anode degradation mechanisms. This is despite the general understanding of silicon as having virtually no chemical reaction with hydrofluoric acid, which commonly only removes its native oxide ($SiO_2$) leaving the underlying silicon intact. In the microelectronics industry, for example, concentrated hydrofluoric acid is purposefully used to etch the oxide under ambient conditions without damaging the underlying silicon.

Nevertheless, the inventors have discovered that hydrofluoric acid etches silicon during electrochemical operations under the corresponding anodic bias/electrical current conditions. The overall corrosion reactions for silicon surface dissolution may proceed, for example, according to the follow equations:

$$Si + 6HF + h^+ \rightarrow SiF_6^{2-} + 6H^+ + 3e^- \qquad \text{(Eq. 1)}$$

$$Si + 6HF + h^+ \rightarrow SiF_6^{2-} + 4H^+ + H_2 + e^- \qquad \text{(Eq. 2)}$$

where $h^+$ represents a hole cation and $e^-$ represents electron injection. The resulting loss of active material (silicon in this case) and increase in its surface area (due to pore formation and surface roughening) was shown to lower anode capacities.

Unfortunately, conventional Li-ion batteries routinely generate hydrofluoric acid during normal operation. Hydrofluoric acid may exist in an undissociated or dissociated form in the battery electrolyte, for example, or may form complex ions such as $HF_2^-$ or $H_2F_3^-$, any and all of which may be able to participate in the dissolution reactions above. In many battery designs, the electrolyte used for Li-ion batteries consists of a Li-based salt and a combination of organic solvents, such as ethylene carbonate ($C_3H_4O_3$), dimethyl carbonate ($C_3H_6O_3$), and ethyl methyl carbonate ($C_4H_8O_3$), among others. For the ionic salt, lithium hexafluorophosphate ($LiPF_6$) is popular due to its high conductivity and transference number. Lithium tetrafluoroborate ($LiBF_4$) is also popular. However, these compounds can readily produce hydrofluoric acid with exposure to residual moisture or during electrochemical cycling. Although it has been previously suggested that the produced hydrofluoric acid may chemically attack the cathode material surface, which commonly consists of lithium oxides or phosphates that are known, like all oxides, to chemically react with hydrofluoric acid (e.g., $LiCoO_2$ or, less commonly, $LiMn_2O_4$, $LiFePO_4$ or $LiCo_{1/3}Ni_{1/3}Mn_{1/3}O_2$), it has not been previously known that hydrofluoric acid may be problematic for the anode material as well.

Accordingly, devices, methods, and other techniques are provided herein for improving the stability of anodes formed from higher capacity materials by reducing or preventing the deleterious effects of hydrofluoric acid etching thereon. In the description below, several embodiments are described with reference to silicon anode materials for illustration purposes only. It will be appreciated that the disclosed techniques may be applied to a variety of higher capacity anode materials including not only silicon as discussed above, but also other anode materials that are susceptible to electrochemical etching by hydrofluoric acid or that experience significant volume changes (e.g., greater than about 5%) during insertion or extraction of lithium. Examples of such materials include: (i) heavily (and "ultra-heavily") doped silicon; (ii) group IV elements; (iii) binary silicon alloys (or mixtures) with metals; (iv) ternary silicon alloys (or mixtures) with metals; and (v) other metals and metal alloys that form alloys with lithium.

Heavily and ultra-heavily doped silicon include silicon doped with a high content of Group III elements, such as boron (B), aluminum (Al), gallium (Ga), indium (In), or thallium (Tl), or a high content of Group V elements, such as nitrogen (N), phosphorus (P), arsenic (As), antimony (Sb), or bismuth (Bi). By "heavily doped" and "ultra-heavily doped," it will be understood that the content of doping atoms is typically in the range of 3,000 parts per million (ppm) to 700,000 ppm, or approximately 0.3% to 70% of the total composition.

Group IV elements used to form higher capacity anode materials may include Ge, Sn, Pb, and their alloys, mixtures, or composites, with the general formula of $Si_a$—$Ge_b$—$Sn_c$—$Pb_d$—$C_e$-$D_f$, where a, b, c, d, e, and f may be zero or non-zero, and where D is a dopant selected from Group III or Group V of the periodic table.

For binary silicon alloys (or mixtures) with metals, the silicon content may be in the range of approximately 20% to 99.7%. Examples of such as alloys (or mixtures) include, but are not limited to: Mg—Si, Ca—Si, Sc—Si, Ti—Si, V—Si, Cr—Si, Mn—Si, Fe—Si, Co—Si, Ni—Si, Cu—Si, Zn—Si, Sr—Si, Y—Si, Zr—Si, Nb—Si, Mo—Si, Tc—Si, Ru—Si, Rh—Si, Pd—Si, Ag—Si, Cd—Si, Ba—Si, Hf—Si, Ta—Si, and W—Si. Such binary alloys may be doped (or heavily doped) with Group III and Group V elements. Alternatively, other Group IV elements may be used instead of silicon to form similar alloys or mixtures with metals. A combination of various Group IV elements may also used to form such alloys or mixtures with metals.

For ternary silicon alloys (or mixtures) with metals, the silicon content may also be in the range of approximately 20% to 99.7%. Such ternary alloys may be doped (or heavily doped) with Group III and Group V elements. Other Group IV elements may also be used instead of silicon to form such alloys or mixtures with metals. Alternatively, other Group IV elements may be used instead of silicon to form similar alloys or mixtures with metals. A combination of various Group IV elements may also used to form such alloys or mixtures with metals.

Examples of other metals and metal alloys that form alloys with lithium include, but are not limited to, Mg, Al, Ga, In, Ag, Zn, Cd, etc., as well as various combinations formed from these metals, their oxides, etc.

In some embodiments, improved anode stability may be achieved by using special electrolyte salts that are either free from fluorine (e.g., F-free Li salts) or thermally stable so as to not form hydrofluoric acid. For example, lithium compounds in the class represented by the formula $R_f^1SO_2X^-(Li^+)YZ_a$ have been found to effectively guard against hydrofluoric acid formation when used as an electrolyte in Li-ion battery cells. Here, X is C or N, a=0 or 1 with the proviso that a=1 when X is C and a=0 when X is N. When a=1, Y and Z may be electron-withdrawing groups selected independently from the group consisting of CN, $SO_2R_f^2$, $SO_2R$, $P(O)(OR)_2$, $CO_2R$, $P(O)R_2$, $C(O)R_f^3$, $C(O)R$, cycloalkenyl groups formed therewith, and H, with the proviso that Y and Z cannot both be H. $R_f^1$, $R_f^2$ and $R_f^3$ may be perfluoroalkyl radicals of 1-4 carbons optionally substituted with one or more ether oxygens. R may be an alkyl group of 1-6 carbons optionally substituted with one or more ether oxygens, or an aryl group optionally further substituted. Alternatively, when a=0, Y may be an electron-withdrawing group represented by the formula $SO_2R_f^6$, where $R_f^6$ is the radical represented by the formula $(R_f^4SO_2N^-(Li^+)SO_2)_mR_f^5$ where m=0 or 1, and $R_f^4$ is $C_nF_{2n+1}$ and $R_f^5$ is $C_nF_{2n+1}$ where n=1-4, optionally substituted with one or more ether oxygens.

Examples of such lithium compound electrolytes include the following: $CF_3SO_2N^-(Li^+)SO_2CF_3$, $CF_3CF_2SO_2N^-(Li^+)SO_2CF_3$, $CF_3CF_2SO_2N^-(Li^+)SO_2CF_2CF_3$, $F_3SO_2N^-(Li^+)SO_2CF_2OCF_3$, $CF_3OCF_2SO_2N^-(Li^+)SO_2CF_2OCF_3$, $C_6F_5SO_2N^-(Li^+)SO_2CF_3$, $C_6F_5SO_2N^-(Li^+)SO_2C_6F_5$ or $CF_3SO_2N^-(Li^+)SO_2PhCF_3$.

Lithium compounds of this type have been employed, in some embodiments, at a concentration in the range of 0.2 to 3 molar (M).

A challenge with the use of $CF_3SO_2N^-(Li^+)SO_2CF_3$ and other imide salts, however, is that they can corrode aluminum foil current collectors. Aluminum foil current collectors are popular for use in the cathode of Li-ion batteries, and have advantages over other types of current collectors such as those made from graphite. Graphite current collectors increase volume, decrease electrical and thermal conductivity, and further complicate the cell assembling process as compared to Al foil current collectors. To address this corrosion and still retain aluminum foil current collectors for use in the cathode, some embodiments use a combination of imide salts and a regular salt (e.g., $LiPF_6$, $LiBF_4$, or $LiClO_4$). For example, a small percentage (e.g., about 10-25%) of $LiPF_6$ mixed in with one or more of the above-described electrolyte compounds has been found to stabilize aluminum current collectors against corrosion, while at the same time improving the stability of higher capacity anodes.

FIGS. 1A-1E illustrate several example electrolyte compositions and their disparate effects on the corrosion of aluminum cathodes. In each case, an aluminum cathode and a lithium anode were used in conjunction with the particular electrolyte compositions, along with a solvent composed of 70% ethylene carbonate by weight and 30% propylene carbonate by weight, and an electrolyte additive at 8% vinylene carbonate by weight. Each cell was annealed for about one hour at 80° C.

In the graph of FIG. 1A, a conventional electrolyte composition including a full 1 M solution of $LiPF_6$ was used. As can be seen from the figure, only a small corrosion current is observed at the cathode, and the corrosion current decreases over repeated cycling. However, this electrolyte composition may be lead to anode degradation as discussed above for many higher capacity anode materials. In the graph of FIG. 1B, an electrolyte composition including a full 1 M solution of an imide salt (in this case, $CF_3SO_2N^-(Li^+)SO_2CF_3$) was used to improve anode stability. However, a substantially larger corrosion current was observed at the cathode as compared to the $LiPF_6$ solution of FIG. 1B, and the resultant corrosion current was not observed to decrease over repeated cycling.

Figure 1C:
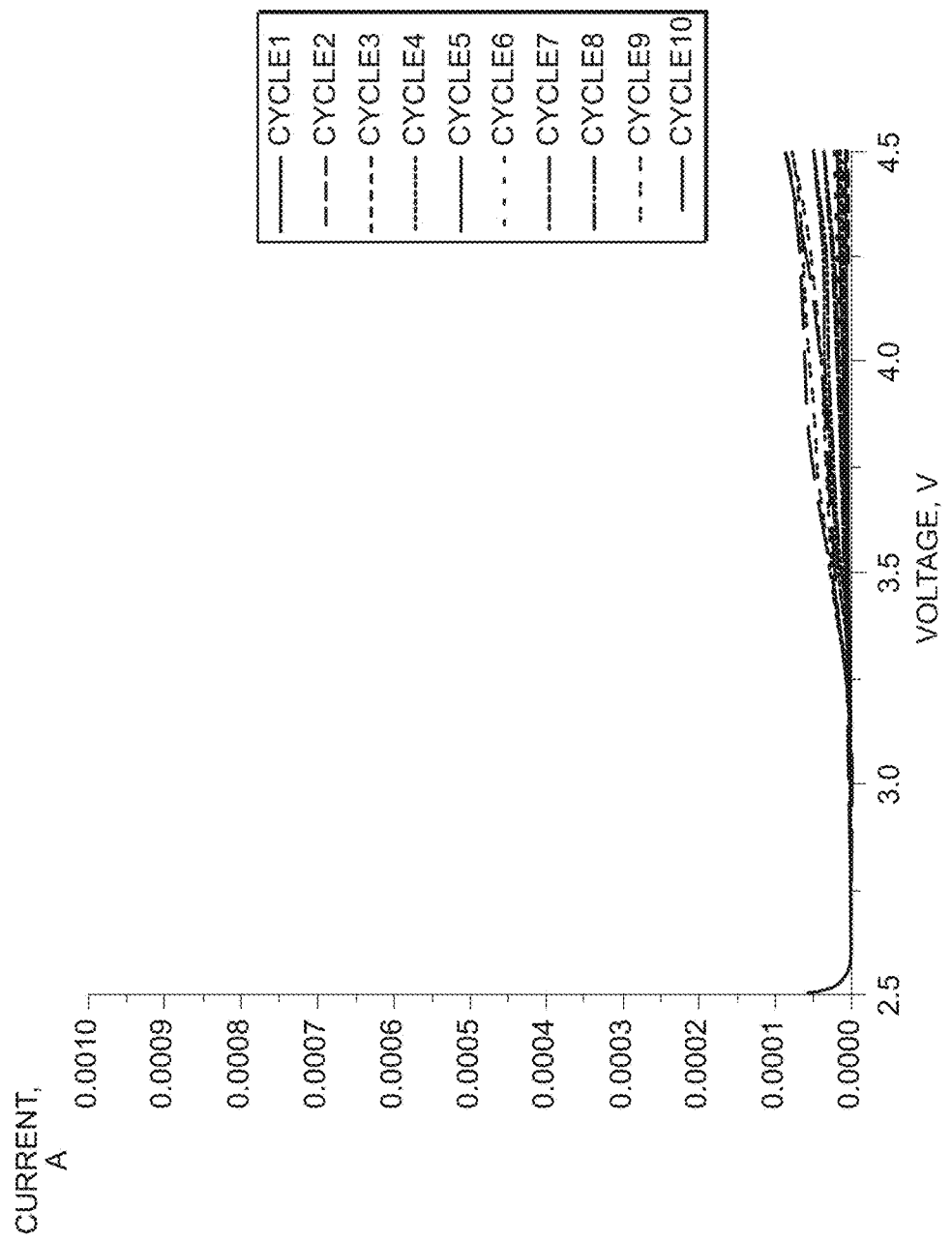

In the graph of FIG. 1C, a small amount of $LiPF_6$ was added to the imide salt composition of FIG. 1B to achieve an electrolyte composition of about 90% imide salt (in this case, $CF_3SO_2N^-(Li^+)SO_2CF_3$) and about 10% $LiPF_6$ by weight. As can be seen from the figure, the resultant corrosion current is significantly reduced from a pure imide salt solution and again only a small corrosion current is observed at the cathode, although the corrosion current was observed to increase over repeated cycling. In the graph of FIG. 1D, the concentration of $LiPF_6$ was increased to about 15% by weight, with the resultant corrosion current being further suppressed. In the graph of FIG. 1E, the concentration of $LiPF_6$ was increased further to about 20% by weight, with the resultant corrosion current being even further suppressed and observed to begin decreasing again over repeated cycling. As demonstrated here, careful mixing of imide salts and regular salts at a particular concentration appropriate for a given application may provide an advantageous compromise between cathode corrosion and anode stability.

In general, the imide salt may make up at least 50% of the electrolyte by weight and still provide the above-noted advantages with respect to improved anode stability. In further embodiments, imide salt percentages in the range of about 75% to about 90% of the electrolyte by weight have been found to be particularly advantageous.

In addition or as an alternative to the special electrolyte mixtures above, improved anode stability may be achieved through special additives selected to neutralize hydrofluoric acid via chemical or electrochemical reactions, without compromising the anode material itself. For example, compounds with base properties may be used to bind to the hydrofluoric acid, and thus mitigate negative effects on cell performance. Lewis bases are one example class of compounds that may be used as moieties capable of binding hydrofluoric acid in Li-ion cells. Lewis bases generally include any compound capable of donating a free pair of electrons to form a Lewis adduct with a Lewis acid, such as and including hydrofluoric acid. Such Lewis bases may include, but are not limited to, amines and boranes. Another example class of compounds for binding hydrofluoric acid includes metal ions that form non-soluble fluorides. Such metal ions may include, but are not limited to, bi-, tri-, and four-valent metal ions, such as calcium (Ca), magnesium (Mg), aluminum (Al), iron (Fe), nickel (Ni), or manganese (Mn) ions. Other example neutralizing agents (alternately referred to as hydrofluoric acid scavenging compounds) include functional groups added to the surface of the anode material that assist in the capture of $F^-$ ions or otherwise react with hydrofluoric acid, such as —COONa or —COOK groups, and other hydrofluoric acid binding metal derivative salts or oxides. Such salts and oxides can be formed from one or more of the following metals: Ca, Mg, Ag, Cu, Zn, Fe, Ni, and Co. The salts can also be carbonates, acetates, alginates, or oxalates.

Hydrofluoric acid neutralizing agents may be introduced into a Li-ion cell in a variety of forms, including in the form of a small molecule or in the form of a polymer, via a variety of cell components, including the electrolyte, the active material, a corresponding binder material, one or more of the electrodes, the battery separator, etc., and using a variety of techniques, such as chemical attachment, physical blending, and others. Several examples are described below.

In some embodiments, the cell electrolyte may be directly infused with one of the above neutralizing agents. For example, a Lewis base may be dissolved into the cell electrolyte. Both polymeric and low molecular weight substances may be used. Utilization of tertiary amines may be advantageous for some applications, because they do not contain hydrogen atoms attached to the nitrogen, which can cause electrolyte decomposition. Such amines can be either aliphatic, aromatic, or mixed in their structure. Examples include, but are not limited to, trialkylamines, N-alkyl(aryl) piperidines, N-alkyl(aryl)morpholines, N,N-dialkylanilines, N-alkyl-N,N-diarylamines, triarylamines, pyridine and alkyl (aryl) substituted pyridines, quinoline and its derivatives, etc. Polymers bearing amine moieties can be used as well. Examples include, but are not limited to, polyacrylates, polymethactylates, aminoderivatives of polystyrene, polyvinylpyridines, etc.

In other embodiments, the surface of certain cell materials (e.g., the electrodes) may be modified to bear at least one hydrofluoric acid neutralizing agent group. For example, metal oxides, phosphates, and silicon can be modified by reaction with N,N-alkyl(aryl)propyltrietoxysilanes, yielding chemically bonded amino groups to the surface of the substrate. Reaction conditions such as moisture concentration, the presence or absence of an acidic catalyst, etc., can be tuned in order to obtain a single monolayer coating or thicker coatings (e.g., on the order of about 2 nm to about 50 nm).

Similarly, the surface of any powder substrate may be covered with a thin layer of polymers containing a hydrofluoric acid neutralizing agent group. To create the polymer, coating particles may be dispersed in a solvent containing the polymer to be coated. By addition of a polymer non-solvent into the dispersion, the polymer can be precipitated onto the surface of the particles. A desired coating thickness may be achieved by varying the polymer and particle concentrations. As noted above, examples of such polymers include, but are not limited to, polyacrylates, polymethactylates, aminoderivatives of polystyrene, polyvinylpyridines, chitosan, chitin, polyethyleneimine, polyallylamine, etc.

Alternatively, elements bearing free electron pairs (Lewis bases) can be introduced into such powder substrates during their synthesis. For example, boron or nitrogen can be used to dope carbon particles by adding boron or nitrogen precursors into a carbon source gas during synthesis.

In still other embodiments, a neutralizing agent group may be attached to the binder. For example, a polymeric binder utilized in Li-ion cell preparation may be used to bear one or more neutralizing agent groups in its structure. These groups may be intrinsically present in an appropriately selected polymer (e.g., chitosan, chitin, aminoderivatives of polystyrene, polyvinylpyridine, polyethyleneimine, polyallylamine, poly(N,N-dialkylaminomethacrylates), etc.), or may be artificially introduced into the binder molecules by via chemical modification. For example, an epoxy group present in the polymer molecule can be reacted with a variety of secondary and primary amines, bringing an amine moiety to the polymer molecule.

In still other embodiments, the battery separator may be used as the support for bearing the neutralizing agent groups. For example, the neutralizing agent group or particle may be chemically attached to the corresponding surface of the separator, or soaked into the separator. Examples of groups that may be chemically attached to the separator surface or particle surface can be derived from, but are not limited to, trialkylamines, N-alkyl(aryl)piperidines, N-alkyl(aryl)morpholines, N,N-dialkylanilines, N-alkyl-N,N-diarylamines, triarylamines, pyridine and alkyl(aryl) substituted pyridines, quinoline and its derivatives, etc. Polymers bearing amine moieties can be used as well. They can be soaked into the separator in the form of a polymer solution or the separator can be impregnated with nanoparticles. Examples of the polymers include, but are not limited to, polyacrylates, polymethactylates, aminoderivatives of polystyrene, polyvinylpiridines, chitosan, chitin, polyethyleneimine, polyallylamine, poly(N,N-dialkylaminomethacrylates), etc.

Modification to select materials, rather than infusion into the electrolyte, for example, may be advantageous for some applications in that it allows the neutralizing agent to be confined to a specific area of the cell, such as the anode, where different chemistry can be utilized. For example, a polymer-bearing Lewis base can be made insoluble in the cell electrolyte, and blended with the binder into the anode composition. In this case, hydrofluoric acid binding properties may be introduced into the electrode and confined to the electrode space. Confinement to a specific area allows the utilization of chemical compounds that are undesirable in other cell components. For example, the confinement of amines to the anode area can prevent undesirable side reactions whereby the amines might otherwise be oxidized on the cathode of the Li-ion cell.

In addition or as an alternative to the special electrolytes and additive compounds above, improved anode stability may also be achieved by the application of a protective coating or film to the surface of the anode material. The protective coating may be formed from or otherwise include material specially selected to reduce or prevent hydrofluoric acid etching of the active anode material, such as select polymers, oxides, halides (such as fluorides or chlorides), oxyhalides (such as oxyfluorides or oxychlorides), carbon, combinations thereof, or other materials. For effective operation of the Li-ion battery, the protective coating is made to be Li-ion permeable. Desirably, and in at least in some designs, the protective coating is made resistant (if not impermeable) to infiltration by the electrolyte solvents as well.

Figure 2:
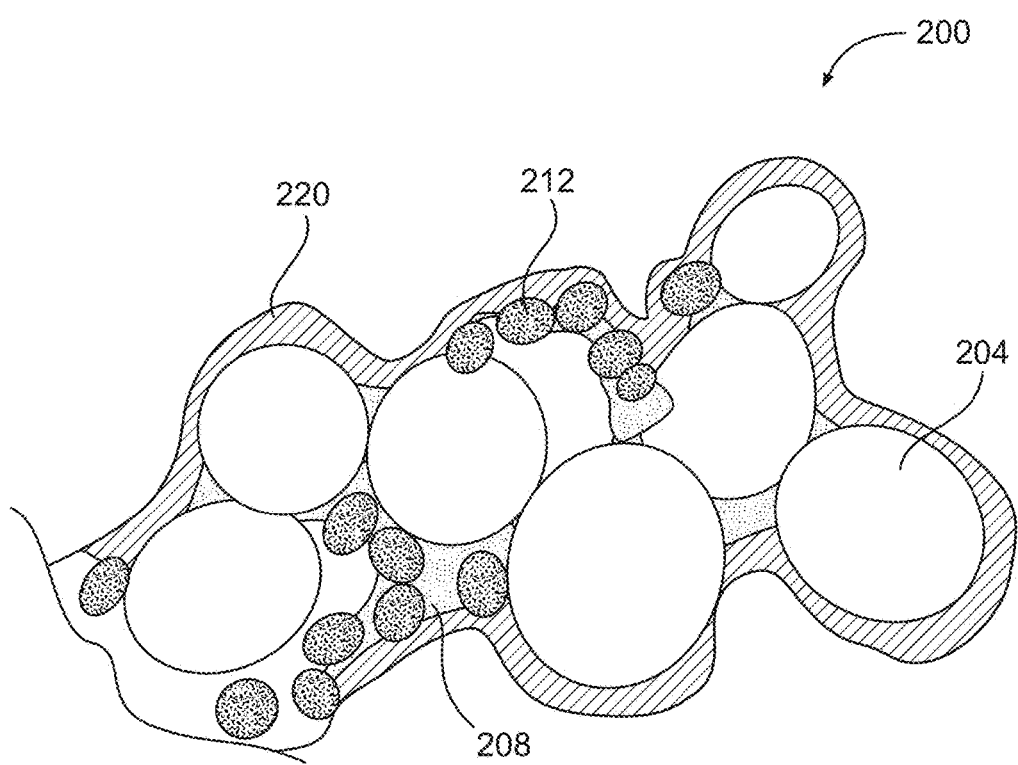
FIG. 2 illustrates an example protective anode coating arrangement according to one or more embodiments.

FIG. 2 illustrates an example protective anode coating arrangement according to one or more embodiments. In this example, the anode 200 is generally formed from a matrix of electrically interconnected particles, including a silicon active material 204 and a binder 208. In silicon-based anodes, the binder 208 binds to the silicon 204 and provides stability. It may enhance the performance of the anode by contributing to the formation of a more stable solid-electrolyte interphase (SEI), which minimizes the irreversible capacity loss due to the volume changes that accompany electrochemical alloying (and dealloying) of silicon and lithium. Conventional binders used in silicon-based anodes are typically carboxymethylcellulose (CMC) and poly(vinylidene fluoride) (PVDF), but other materials may be used as desired. Other examples include, but are not limited to, polyacrylic acid or metal salts of alginic acid, which may include, for example, metal cations of Li+, Na+, K+, Mg2+, Ca2+, Al3+, Ti4+, Sn4+, etc. In the illustrated design, the anode 200 also includes a carbon conductive additive 212 that is used to seal at least a portion of the interface between the silicon 204 and the binder 208 during initial cycling of the battery.

The anode structure 200 further includes a protective coating 220 of the type described above that at least partially encases the silicon 204, binder 208, and conductive additive 212. As shown, the protective coating 220 may be adhered onto the surface of the anode 200 and act as a barrier to the electrolyte and any hydrofluoric acid contained therein (while remaining permeable to Li ions), preventing it from deteriorating the silicon active material 204. As discussed above, the protective coating 220 may be formed from select polymers, oxides, fluorides, carbon, combinations thereof, or other materials.

Figure 3A:
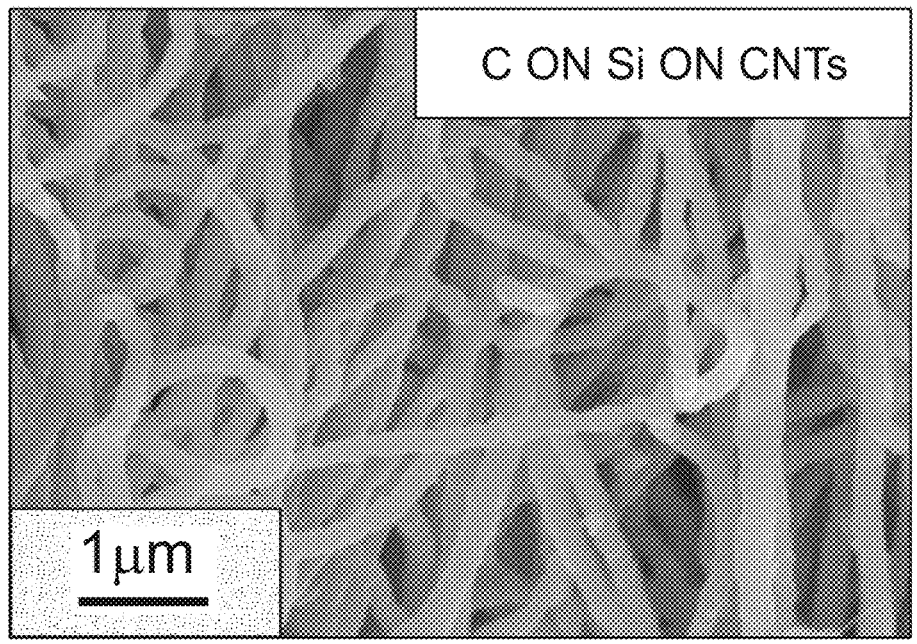
FIGS. 3A-3B illustrate scanning electron microscope (SEM) and transmission electron microscope (TEM) images, respectively, of an example carbon protective coating according to one embodiment.
Figure 3B:
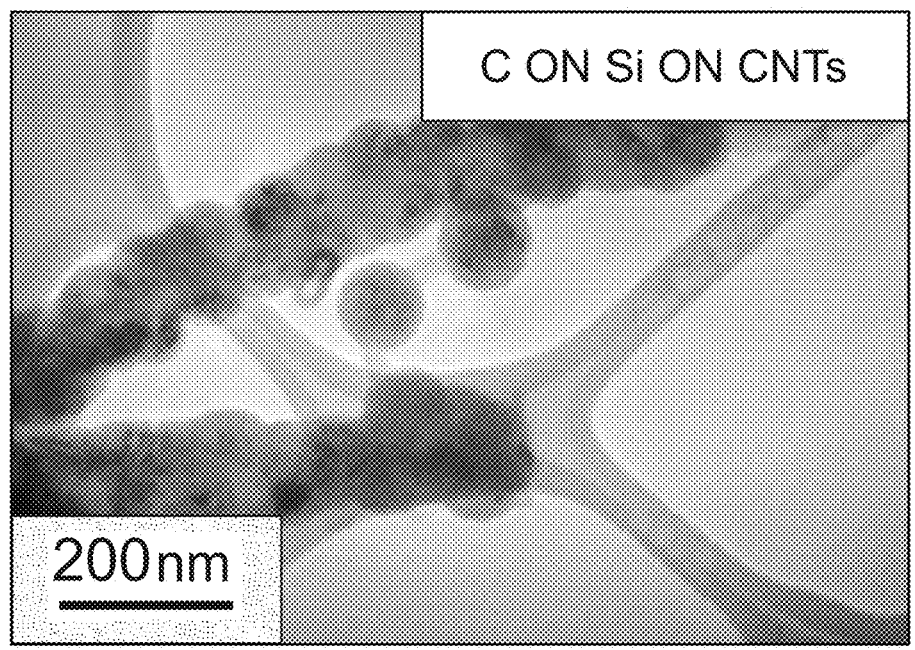

FIGS. 3A-3B illustrate scanning electron microscope (SEM) and transmission electron microscope (TEM) images, respectively, of an example carbon protective coating according to one embodiment. In this example, silicon-coated Vertically Aligned Carbon Nanotubes (VACNTs) were used as the anode material and then further coated with a layer of amorphous carbon used as the protective coating to guard against hydrofluoric acid etching. As shown (and further evident from X-ray diffraction studies), the rough, beaded silicon-coated VACNT structure is smoothed after deposition, and the silicon crystallizes. The external carbon coating resists hydrofluoric acid etching and enhances the structural integrity or conductivity of the silicon during lithiation and delithiation. Furthermore, it ensures that pore formation still occurs in an anisotropic fashion due to the polycrystalline structure of the silicon. The resistance to hydrofluoric acid etching provided by such an external carbon coating may be tailored to a particular environment by adjusting its thickness.

In some embodiments, the protective coating is made flexible so that it can expand and contract with the anode active material during lithation and delithiation. For example, the protective coating may be made from a polymer chain that is able to slide over itself. Other examples include metals that naturally form protective oxide layers on their surfaces. These include, but are not limited to, aluminum (Al), titanium (Ti), chromium (Cr), tantalum (Ta), niobium (Nb), and others. Deposition of such coatings can be performed using a variety of oxide coating deposition techniques, including physical vapor deposition, chemical vapor deposition, magnetron sputtering, atomic layer deposition, microwave-assisted deposition, wet chemistry, and others.

For example, metal oxide precursors in the form of a water-soluble salt may be added to the suspension (in water) of the particles to be coated. The addition of the base (e.g., sodium hydroxide or amine) causes formation of a metal (Me) hydroxide. Active particles suspended in the mixture may then act as nucleation sites for Me-hydroxide precipitation. Once particles are coated with a shell of Me-hydroxide, they can be annealed in order to convert the hydroxide shell into a corresponding oxide layer that is then well-adhered to the particle surface.

In other examples, an aluminum oxide coating may be produced using wet chemistry techniques according to the following steps: (i) dissolving aluminum isopropoxide in ethanol; (ii) drying the solution in the presence of active silicon particles; and (iii) annealing to transform the aluminum isopropoxide coating into an aluminum oxide coating. In still other examples, an iron fluoride coating may be produced using wet chemistry techniques according to the following steps: (i) dissolving iron (Fe) powder in an aqueous solution of fluorosilicic acid; (ii) drying the solution in the presence of active silicon particles to form a coating composed of $FeSiF_6 \cdot H_2O$; and (iii) transforming the $FeSiF_6 \cdot H_2O$ into iron fluoride ($FeF_x$) by annealing the coated powder in an inert environment, such as argon gas or in vacuum.

The formation of a sufficiently flexible protective coating may be advantageous for certain anode materials like silicon that exhibit an increase, and subsequent decrease, in volume of up to about 400% during cycling. Flexibility of the protective coating prevents the formation of cracks or voids that would otherwise allow hydrofluoric acid to penetrate through to the active material.

In other embodiments, however, it has been found that the use of a mechanically stable and plastically deformable protective coating may provide further advantages when appropriately deployed. For example, a shell structure may be used to coat or encase the anode surface. During the initial insertion (e.g., the first cycle of a Li-ion battery), the outer surface area of such a protective coating may be plastically deformed and expand to match the expanded state of the lithiated anode material. However, upon lithium extraction, this type of protective coating remains mechanically stable and largely retains its expanded state. In this way, a shell structure is created that fits the anode in the expanded lithiated state, but allows for contraction of the active material core during delithiation without fracturing.

Figure 4:
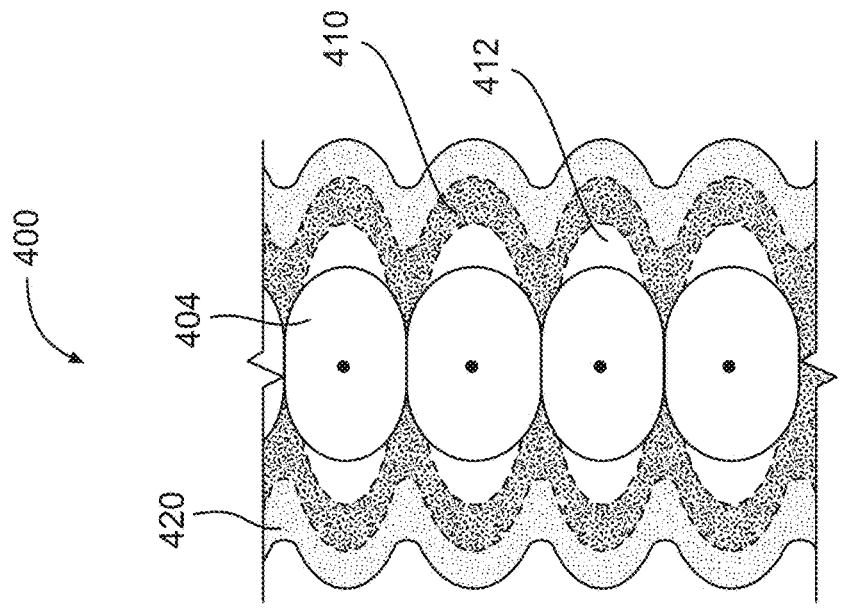
FIG. 4 illustrates the lithiation and delithiation of an example shell protective anode coating arrangement according to one or more embodiments.
Figure 4:
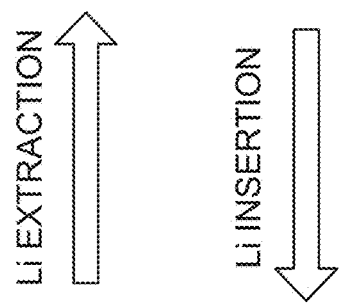
Figure 4:
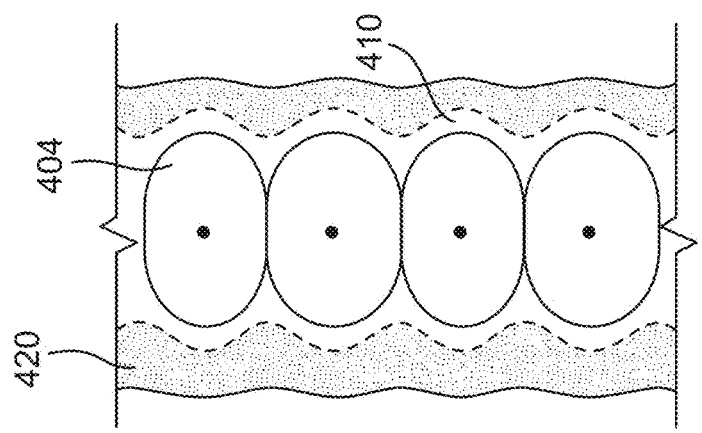

FIG. 4 illustrates the lithiation and delithiation of an example shell protective anode coating arrangement according to one or more embodiments. In this example, as with the design shown in FIG. 2, the anode 400 is generally formed from a matrix of electrically interconnected particles, including a silicon active material 404 and potentially other materials, such as a binder, carbon conductive additive, or the like as discussed above (not shown). A protective coating 410 is provided over at least part of the silicon active material 404, along with any other materials of the anode 400.

The protective coating 410 is designed such that, at least after an initial cycling period, voids or pockets 412 are formed inside the protective coating 410 (in the delithiated state) that provide space for the silicon 404 to expand during lithiation. In this way, the outer surface area of the protective coating 410 may remain substantially stable throughout the subsequent cycles of silicon-lithium expansion (during lithium insertion) and compaction (during lithium extraction) as part of normal battery operation.

An SEI layer 420 is also shown in FIG. 4, where it is formed (on initial charging) over the protective coating 410 rather than directly on the surface of the silicon 404 as it otherwise would. SEI stability and resistance against permeation of hydrofluoric acid, solvent molecules, and other harmful components can be compromised by the large volume changes in silicon particles during lithium insertion/extraction, as its outer surface area is continually expanded and contracted. This expansion/contraction typically causes the formation of SEI defects and voids, which leads to the degradation of its resistance to permeation. However, with the shell protective coating 410 in the design of FIG. 4 providing a more stable outer surface area for the SEI 420 to form on, the mechanical stability of the SEI layer 420 may be enhanced. A more stable SEI layer 420 provides additional protections against hydrofluoric acid etching as well as other degradation processes.

In some embodiments, a ceramic coating material may be used to form the protective coating 410. Examples of ceramic coatings include, but are not limited to: aluminum oxide or lithiated aluminum oxide, titanium oxide or lithiated titanium oxide, zinc oxide or lithiated zinc oxide, niobium oxide or lithiated niobium oxide, and tantalum oxide or lithiated tantalum oxide. Other examples of ceramic coatings include, but are not limited to: vanadium fluoride, vanadium oxyfluoride, iron fluoride, iron oxyfluoride, aluminum fluoride, aluminum oxyfluoride, titanium fluoride, titanium oxyfluoride, zinc fluoride, zinc oxyfluoride, niobium fluoride, niobium oxyfluoride, tantalum fluoride, tantalum oxyfluoride, nickel fluoride, nickel oxyfluoride, magnesium fluoride, magnesium oxyfluoride, copper fluoride, copper oxyfluoride, manganese fluoride, and manganese oxyfluoride. These ceramics are both Li-ion permeable and electrolyte solvent impermeable, making them well-suited for use in Li-ion battery applications.

In other embodiments, a polymer coating may be used to form the protective coating 410. For example, the polymer coating may be applied to the surface of the silicon 404 as a sacrificial layer and then carbonized (e.g., through pyrolysis or thermal annealing) to leave behind a carbon shell acting as the protective coating 410.

In still other embodiments, a combination of materials may be used to form a composite protective anode coating. The appropriate selection and particular application of different materials to form the composite coating may lead to various further advantages, depending on the desired application, as the composite may be designed to take advantage of several disparate physical or chemical properties of the two or more constituent materials not found in either material alone.

FIGS. 5A-5F illustrate several different example composite protective anode coating structures according to various embodiments. In each case, the anode core being protected is composed of a matrix of electrically interconnected particles, shown for illustration purposes simply as a single, exemplary silicon active material particle 504. However, it will be appreciated that the exemplary silicon particle 504 may in fact be composed of clusters of particles, part of a silicon composite, part of silicon-carbon composite, etc. It will also be appreciated that the primary active material may be a material other than silicon, and that other secondary materials may be included in the anode core as well, such as a binder, carbon conductive additive, or the like, as discussed above.

Figure 5C:
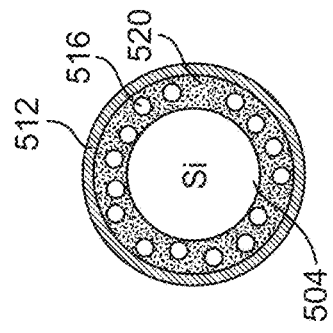
FIGS. 5A-5F illustrate several different example composite protective anode coating structures according to various embodiments.
Figure 5F:
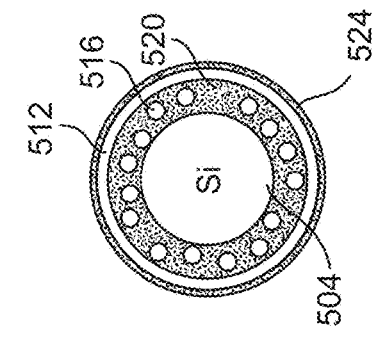
Figure 5B:
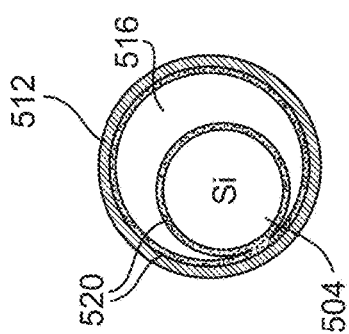
Figure 5E:
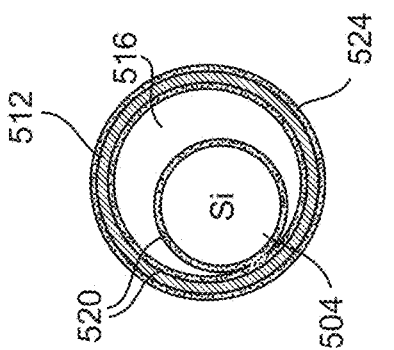
Figure 5A:
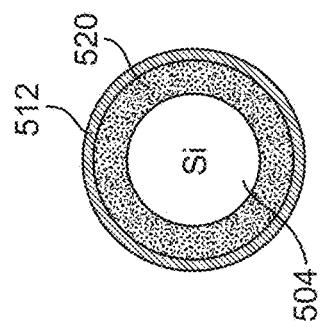

In the example designs shown in FIGS. 5A-5C, the composite protective coating is formed from an outer protective layer 512 (in this case, a metal oxide or metal fluoride shell) and an inner protective layer 520 (in this case, a carbon-based material). The use of a metal oxide or metal fluoride outer protective layer 512 prevents the diffusion of hydrofluoric acid, solvent molecules, and other harmful or reactive molecules, and keeps them from reaching the surface of the silicon active material 504. The use of a carbon-based inner protective layer 520 between the silicon active material 504 and the metal oxide or metal fluoride outer protective layer 512 provides an electrically and ionically conductive path for the flow of electric current and Li ions. The carbon-based inner protective layer 520 also forms an additional barrier against the diffusion of hydrofluoric acid, solvent molecules, and other harmful or reactive molecules, further reducing the potential degradation of the underlying silicon active material 504.

The combination of a mechanically stable outer shell structure that is both solid and an insoluble ionic conductor, in the form of the metal oxide or metal fluoride outer protective layer 512, for example, and a softer, flexible inner coating in the form of the carbon-based inner protective layer 520 therefore offers the advantages of both materials in a single, composite design. Further advantages may be achieved, however, through different structures of the inner protective layer 520, which may be formed in a variety of ways with different properties and different corresponding advantages. The various designs shown in FIGS. 5A-5C illustrate several examples.

In the design of FIG. 5A, the inner protective layer 520 is formed as a solid layer, such as an electrically and ionically conductive carbon coating. This type of dense carbon layer helps to weaken the bonding between the silicon active material 504 and the inner surface of the outer protective layer 512, allowing the outer protective layer 512 to remain expanded and mechanically stable as the silicon active material 504 contracts inside of it during delithiation. As discussed above, a mechanical stable protective coating such as the outer protective layer 512 provides for the formation of a more stable SEI layer, which in turn provides additional protections against hydrofluoric acid etching as well as other degradation processes. The carbon coating is also generally flexible, and provides some cushion for the expansion of the underlying silicon active material 504 during lithiation, lessening any stress on the outer protective layer 512.

However, for some applications, additional expansion capacity may be required. Accordingly, in the design of FIG. 5B, the inner protective layer 520 is formed as a hollow layer, with thin coatings of carbonaceous material on the outer surface of the silicon active material 504 and the inner surface of the outer protective layer 512, leaving a void or pore 516 in between. The additional volume of the pore 516 provides further space for silicon expansion during lithiation, and may help to further alleviate any stress that may be exerted on the outer protective layer 512 as compared to the denser carbon coating in the design of FIG. 5A. These thin coatings on the outer surface of the silicon active material 504 and the inner surface of the outer protective layer 512 still provide the advantages of an intervening electrically and ionically conductive coating as in the design of FIG. 5A, but to a more limited extent under the tradeoff of improved mechanical stress reduction.

Accordingly, the further design of FIG. 5C represents a more general and intermediate approach, in which the inner protective layer 520 is formed with a series of smaller pores 516 between the silicon active material 504 and the inner surface of the outer protective layer 512. It will be appreciated that the pores 516 may not be perfectly arranged solely between the entire active material 504 and the inner surface of the outer protective layer 512, and may instead, at times, infiltrate the active material 504 and form between any clusters of particles or composites making up the active material 504 during battery operation. This arrangement is intended to be included in the above description of the series of pores 516 as being formed "between" the silicon active material 504 and the inner surface of the outer protective layer 512.

The density of the pores 516 may be tailored to fit a particular application (e.g., a particular active material), and adjusted to achieve a desired balance between the amount of carbon in the inner protective layer 520 (and hence, its electrical and ionic conductivity characteristics) and the amount of free space in the inner protective layer 520 (and hence, its capacity for expansion during lithiation and delithiation). For some applications including a silicon active material, it has been found that a total pore volume of approximately 50% of the volume occupied by the silicon active material core (or greater) provides sufficient space for expansion during lithiation.

Figure 5D:
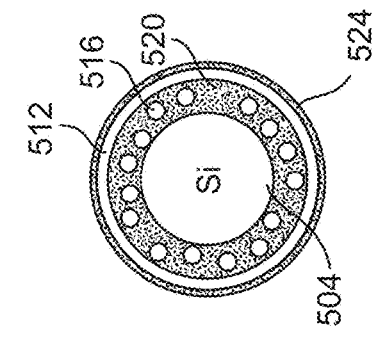

The example designs shown in FIGS. 5D-5F are identical to those shown in FIGS. 5A-5C, respectively, except that they include an additional conductive coating layer 524 around the outer protective layer 512. The additional conductive coating layer 524 provides enhanced electrical connectivity among the constituent anode particles, which helps form an electrically conductive anode from the anode slurry. The additional conductive coating layer 524 may be formed from carbon or a conductive polymer, for example, and provides a still further barrier against the diffusion of hydrofluoric acid, solvent molecules, and other harmful or reactive molecules, further reducing the potential degradation of the underlying silicon active material 504.

Figure 6A:
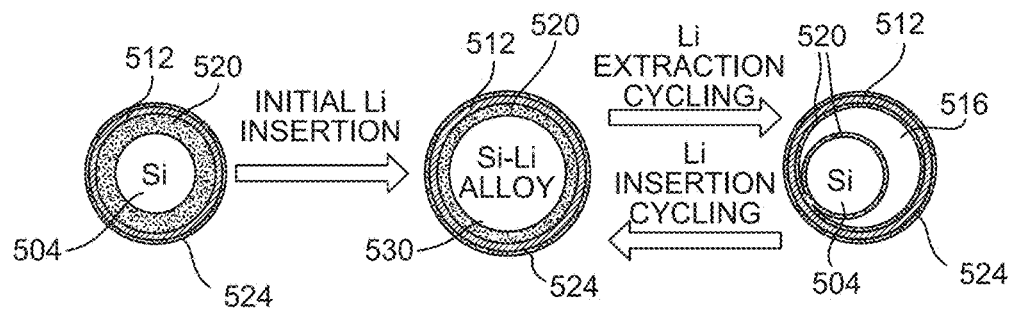
FIGS. 6A-6C illustrate the effects of lithiation and delithiation on the example composite protective anode coating structures of FIGS. 5D-5F.
Figure 6B:
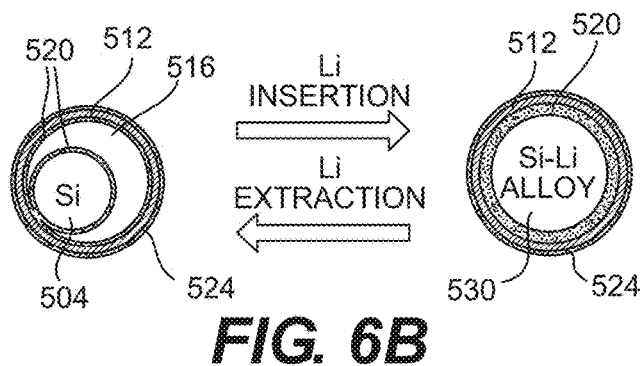
Figure 6C:
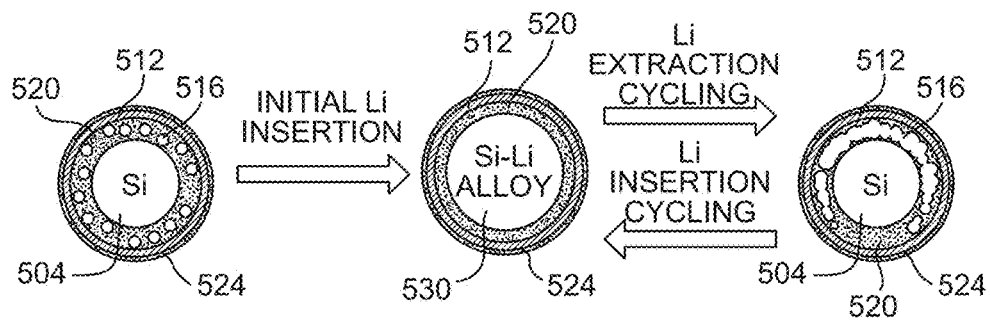

FIGS. 6A-6C illustrate the effects of lithiation and delithiation on the example composite protective anode coating structures of FIGS. 5D-5F. For simplicity, only the designs of FIGS. 5D-5F are shown explicitly, but the effects for FIGS. 5A-5C are substantially similar.

As shown in FIG. 6A, during initial Li insertion (e.g., the first charge of a Li-ion battery), Li ions are inserted into the silicon active material 504 to form a Si—Li alloy 530. During formation, its outer surface area expands significantly, as described above, displacing and compacting the carbon-based inner protective layer 520. Subsequently, during additional cycling, Li ions are extracted from the Si—Li alloy 530, returning it to its native silicon state 524. Depending on the particular inner protective layer 520 material used and the volume change experienced, the inner protective layer 520 or a portion thereof may retain its compacted form as shown. Thus, in some cases, the inner protective layer 520 may be compacted, at least partially, and a pore or pores 516 similar to those discussed above may be formed in the intervening space. The formation of such pores 516 in this manner may be advantageous in some applications (e.g., to accommodate further volume changes).

Turning to FIG. 6B, for structures of the inner protective layer 520 having a large pore design, the intrinsic space provided to accommodate silicon swelling may be sufficient to avoid any initial insertion effects. In this case, the insertion of Li ions into the silicon active material 504 forms the Si—Li alloy 530, its outer surface area expands accordingly to fill or partially fill the pore 516, and shrinks back to its original size during delithiation as the Si—Li-alloy 530 returns to its native silicon state 524.

Turning to FIG. 6C, for intermediate density pore designs, the initial Li insertion and accompanying expansion of the silicon active material 504 to form the Si—Li alloy 530 may cause a displacement of the various small pores 516, which typically aggregate together as they are compacted as shown. Subsequently, during additional cycling, Li ions are extracted from the Si—Li alloy 530 and it returns to its native silicon state 524. Depending on the density and initial arrangement of the various pores 516, as well as the volume change experienced, the pores 516 may return to their original configuration and density, or to an altered configuration and density as shown.

Initial lithium insertion, such as that shown in FIGS. 6A and 6C, can be performed in a variety of ways, including both in-situ (after Li-ion battery cell assembly) and ex-situ (before Li-ion battery cell assembly). For example, in-situ lithium insertion into an anode material may involve electrochemical lithium insertion during operation of the Li-ion battery, such as insertion of lithium taken from a Li-containing cathode material. For ex-situ lithium insertion into an anode material, lithiation may involve gas-phase reactions prior to assembling the anode powder into the electrode or prior to assembling the electrode into the Li-ion battery cell. Alternatively, ex-situ lithium insertion may include room temperature lithiation of the anode, according to which a soft, stabilized (dry room friendly) lithium powder may be deposited and spread onto a surface of a pre-formed porous anode in order to induce lithiation (primarily upon contact with the electrolyte). If such a process is performed in the presence of a solvent, an SEI layer may be simultaneously pre-formed on the anode surface. Lithium foil may be used instead of lithium powder in some designs.

It will be appreciated that the different composite protective anode coating structures of FIGS. 5A-5F can be formed in a variety of ways. Several example formation methods are described below.

Figure 7:
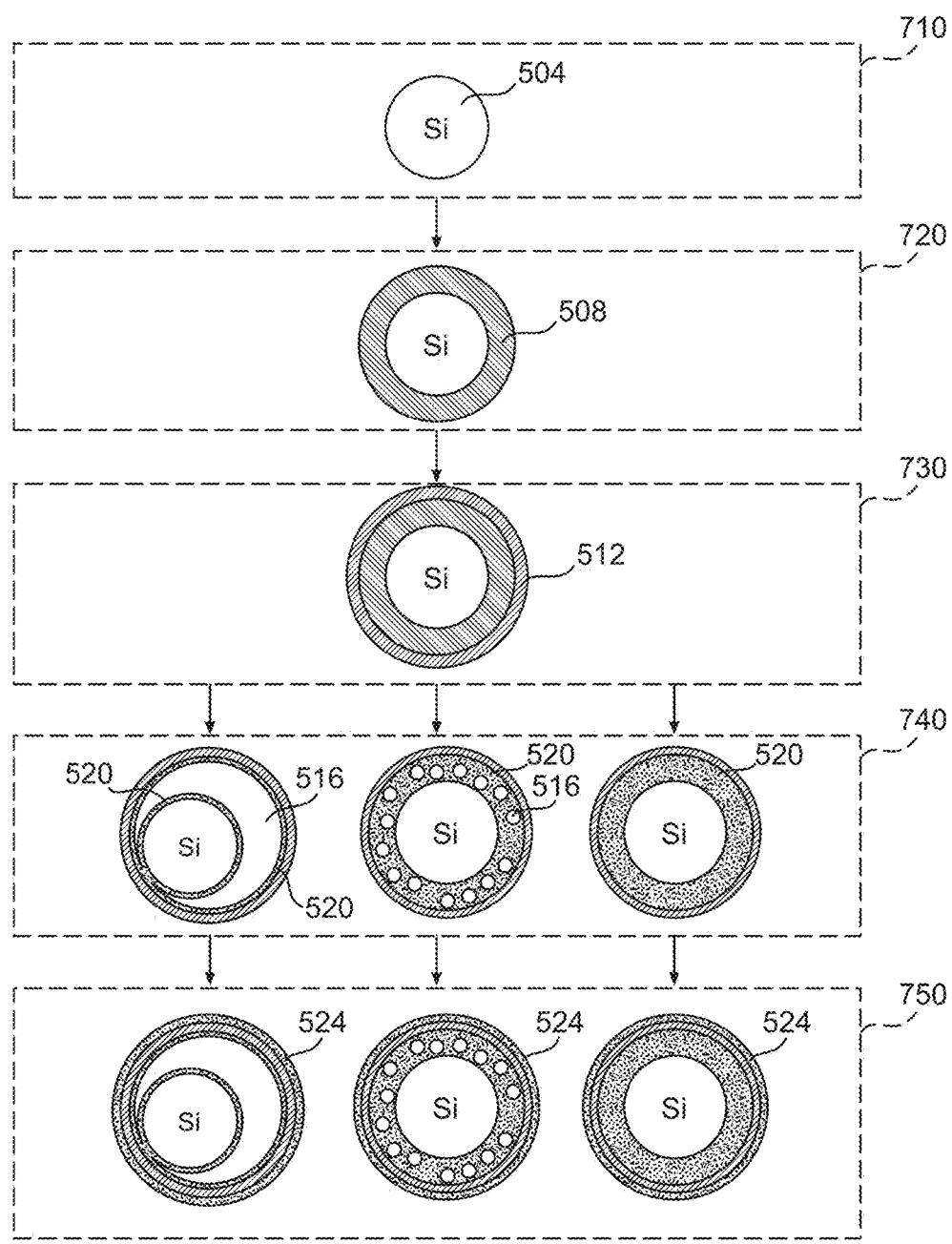
FIG. 7 is a graphical flow diagram depicting a formation of the example composite protective anode coating structures of FIGS. 5A-5F according to one or more embodiments.

FIG. 7 is a graphical flow diagram depicting a formation of the example composite protective anode coating structures of FIGS. 5A-5F according to one or more embodiments. In this example, formation begins with the provision or aggregation of the silicon active material particle(s) 504 in step 710. Again, it will be appreciated that the silicon particle 504 is shown in the singular for illustration purposes only, and may in fact be composed of clusters of particles, formed from part of a silicon composite, part of silicon-carbon composite, etc. It will also again be appreciated that the primary active material may be a material other than silicon, which is shown only as an example, and that other secondary materials may be included in the anode core as well, such as a binder, carbon conductive additive, or the like, as discussed above.

In step 720, a sacrificial polymer coating 508, for example, is applied to the silicon particle 504 as a precursor to the inner protective layer 520. The sacrificial polymer coating 508 and silicon particle 504 are then further coated with the outer protective layer 512 (e.g., a metal oxide or metal fluoride) in step 730, using one or more known methods, such as atomic layer deposition (ALD), chemical vapor deposition (CVD), various wet chemistry methods, or others known in the art.

In step 740, one of the different pore designs of FIGS. 5A-5F is selected, as desired, and formed out of the sacrificial polymer coating 508. The particular processes involved depend on the desired structure of the inner protective layer 520 and its associated pores 516 (or lack thereof, as the case may be). In particular, the sacrificial polymer coating 508 can be transformed into the desired structure via heat treatment (e.g., annealing in a gaseous environment), via a hydrothermal process, or other techniques as appropriate for the desired structure. Depending on the polymer composition and transformation conditions, the sacrificial polymer may be transformed into: (a) a dense carbon structure as in the design of FIG. 5A; (b) a thin layer of carbonaceous material covering the silicon particle 504 and the inner surface of the outer protective layer 512 as in the design of FIG. 5B; or (c) a porous carbon structure as in the design of FIG. 5C.

For the further designs of FIGS. 5D-5F, additional processing is performed in step 750 to form the additional conductive polymer or carbon coating 524, for example, on the surface of the outer protective layer 512. For an additional conductive coating 524 formed from carbon, the carbon can be deposited by CVD (e.g., decomposition of hydrocarbon gaseous precursors), formation and decomposition of a polymer layer, hydrothermal carbonization, or other techniques. For an additional conductive coating 524 formed from conductive polymers, the conductive polymer coating can be deposited via plasma assisted polymerization, microwave assisted polymerization, solution polymerization in the suspension of the particles to be coated or spray-drying of joint suspension of the particles with the polymer in solution or in the form of polymer nanoparticles.

Figure 8:
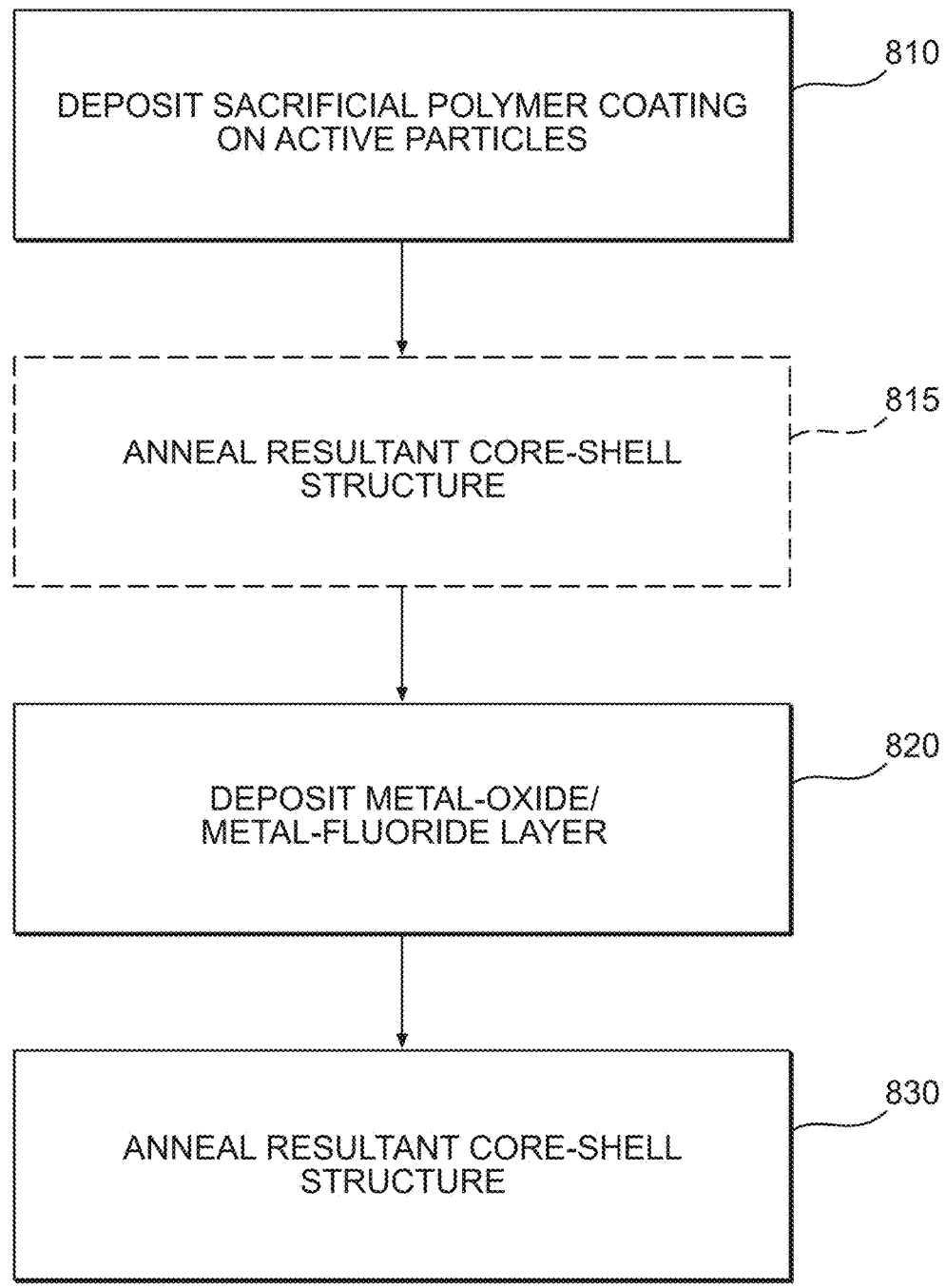
FIG. 8 is a process flow diagram illustrating an example method of forming a mechanically stable shell protective anode coating according to one or more embodiments.

FIG. 8 is a process flow diagram illustrating an example method of forming a mechanically stable shell protective anode coating according to one or more embodiments. In this example, a sacrificial coating composed of a polymer is initially deposited on the surface of the desired active particles (step 810). Subsequently, a metal oxide or metal fluoride layer is deposited (step 820), using one or more conventional techniques, examples of which are discussed above. After oxide layer deposition, the resultant core-shell structure is annealed at temperatures sufficiently high to carbonize the intermediate polymer layer (step 830). Because of the polymer volume decrease during carbonization, voids may be formed between the active particle core and the metal oxide shell. The thin carbon layer obtained after polymer carbonization enhances electronic conductivity inside the composite particle. The amount of free volume between the active particle and metal oxide layer can be tuned by changing the thickness of the polymer coating and the type of polymer employed.

As illustrated by the optional step 815, in some embodiments, additional procedures may be used to achieve enhanced adhesion between the metal oxide layer and the active particles. As shown, after deposition of the sacrificial polymer coating onto the surface of the active particles (step 810), the resultant combination may be annealed at a temperature above the glass transition temperature of the polymer (optional step 815). Upon heating, the polymer coating transforms into a viscous liquid and partially dewetts from the particle surface. Initially hidden by the polymer, the particle surface is accordingly opened. Thus, when the metal oxide film is deposited on top of the polymer and partially exposed particle surface (step 820), the dewetted particle areas provide direct points of contact between the metal oxide and particle surface. The subsequent carbonization step (step 830) again creates voids under the metal oxide layer, which allow for particle expansion during battery usage.

Figure 9:
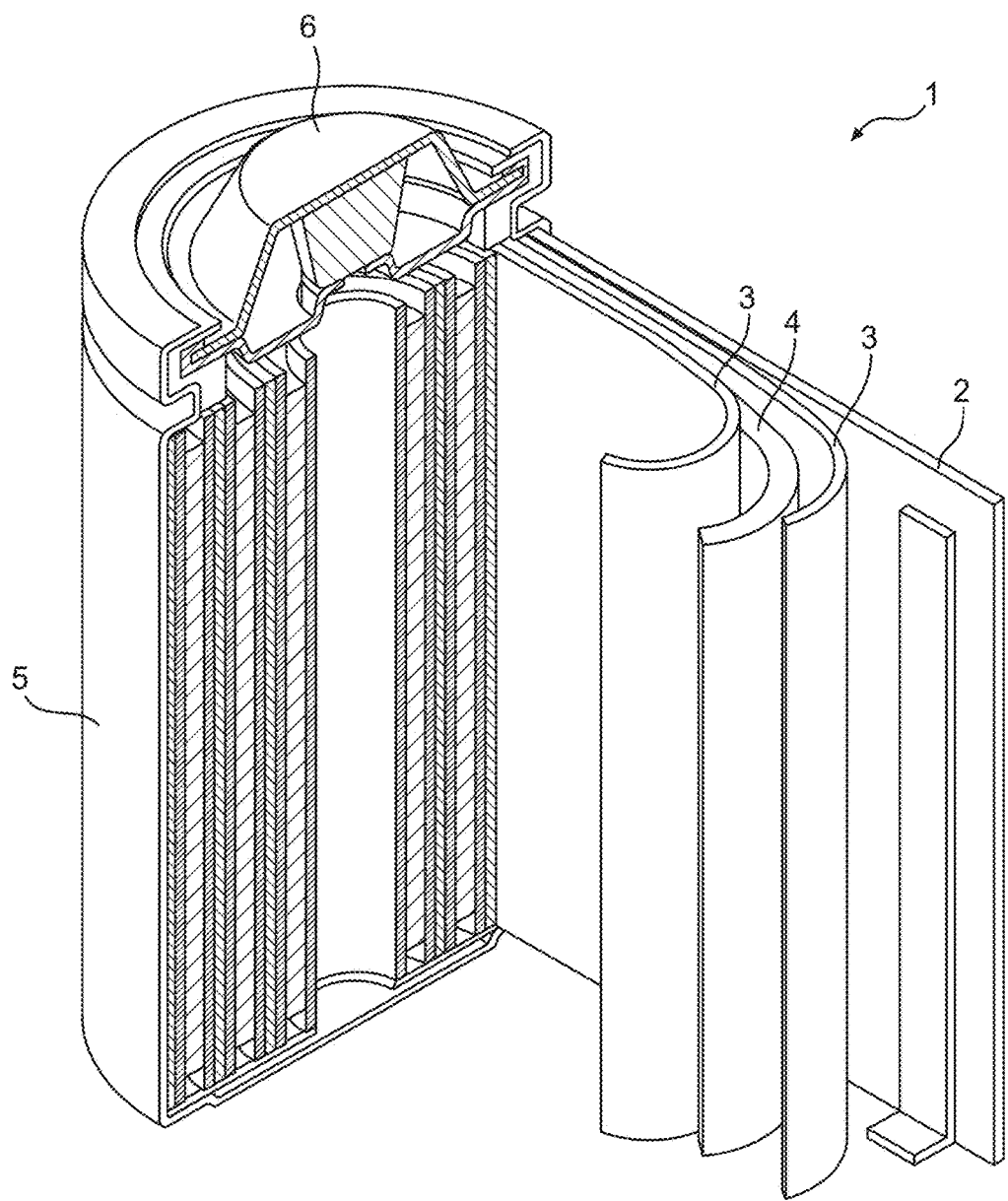
FIG. 9 illustrates an example Li-ion battery in which the above devices, methods, and other techniques, or combinations thereof, may be applied according to various embodiments.

FIG. 9 illustrates an example Li-ion battery in which the above devices, methods, and other techniques, or combinations thereof, may be applied according to various embodiments. A cylindrical battery is shown here for illustration purposes, but other types of arrangements, including prismatic or pouch (laminate-type) batteries, may also be used as desired. The example Li-ion battery 1 includes a negative anode 2, a positive cathode 3, a separator 4 interposed between the anode 2 and the cathode 3, an electrolyte impregnating the separator 4, a battery case 5, and a sealing member 6 sealing the battery case 5.

It will be appreciated that the example Li-ion battery 1 may simultaneously embody multiple aspects of the present invention in various designs. For example, the Li-ion battery 1 may contain: (a) an active anode containing a silicon material protected by a Li-ion permeable carbon, polymer and oxide or fluoride shell; (b) an electrolyte composed of (i) an imide-containing salt (e.g., 50-95% of the total salt content), (ii) a solvent based on a mixture of carbonates, and (iii) an electrolyte additive such as dimethyl acetamide (DMAC); and (c) a cathode containing an oxide, fluoride, or sulfur active material. Another example combination may include the use of: (a) an anode containing a silicon active material protected by a Li-ion permeable oxide shell and HF-scavenger material; (b) an electrolyte composed of (i) an $LiPF_6$ salt, (ii) a solvent based on a mixture of carbonates, and (iii) a Lewis base electrolyte additive, such as DMAC; and (c) a cathode containing an oxide, fluoride, or sulfur active material. In general, it will be appreciated that any combination of the above embodiments may be employed as desired.

The previous description is provided to enable any person skilled in the art to make or use embodiments of the present invention. It will be appreciated, however, that the present invention is not limited to the particular formulations, process steps, and materials disclosed herein, as various modifications to these embodiments will be readily apparent to those skilled in the art. That is, the generic principles defined herein may be applied to other embodiments without departing from the spirit or scope of the invention, which should only be defined by the following claims and all equivalents.

The invention claimed is:

1. A Li-ion battery, comprising:
   a cathode;
   an anode comprising active particles that comprise at least one of silicon (Si), germanium (Ge), tin (Sn), titanium (Ti), aluminum (Al), or magnesium (Mg);
   an electrolyte ionically coupling the anode and the cathode;
   a separator electrically separating the anode and the cathode; and at least one hydrofluoric acid neutralizing agent incorporated into the anode as part of a polymer coating on each of the active particles in the anode, and wherein the at least one hydrofluoric acid neutralizing agent comprises:
a hydrofluoric acid binding metal derivative salt comprising Ca, Mg, Ag, Cu, Fe, Ni, or Co,
a hydrofluoric acid binding metal derivative oxide comprising Ca or Cu, or
a Lewis base having a free pair of electrons.

2. The Li-ion battery of claim 1, wherein the at least one hydrofluoric acid neutralizing agent comprises the hydrofluoric acid binding metal derivative salt.

3. The Li-ion battery of claim 1, wherein the at least one hydrofluoric acid neutralizing agent comprises the hydrofluoric acid binding metal derivative oxide comprising Ca or Cu.

4. The Li-ion battery of claim 1, wherein the at least one hydrofluoric acid neutralizing agent comprises the Lewis base having a free pair of electrons.

5. An anode composition, comprising:
active particles that comprise at least one of silicon (Si), germanium (Ge), tin (Sn), titanium (Ti), aluminum (Al), or magnesium (Mg), each of the active particles including a polymer coating that incorporates at least one hydrofluoric acid neutralizing agent, wherein the at least one hydrofluoric acid neutralizing agent comprises:
a hydrofluoric acid binding metal derivative salt comprising Ca, Mg, Ag, Cu, Fe, Ni, or Co,
a hydrofluoric acid binding metal derivative oxide comprising Ca or Cu, or
a Lewis base having a free pair of electrons.

6. The anode composition of claim 5, wherein the at least one hydrofluoric acid neutralizing agent comprises the hydrofluoric acid binding metal derivative salt.

7. The anode composition of claim 5, wherein the at least one hydrofluoric acid neutralizing agent comprises the hydrofluoric acid binding metal derivative oxide comprising Ca or Cu.

8. The anode composition of claim 5, wherein the at least one hydrofluoric acid neutralizing agent comprises the Lewis base having a free pair of electrons.

* * * * *